United States Patent
Ruinart De Brimont et al.

(10) Patent No.: US 11,752,733 B2
(45) Date of Patent: Sep. 12, 2023

(54) LIGHTWEIGHT FILLER FOR WATERPROOFING BITUMEN MEMBRANES

(71) Applicant: ICOPAL APS, Herlev (DK)

(72) Inventors: Mathias Ruinart De Brimont, Malmö (SE); Andreas Hörnig, Heiligenstadt (DE); Eirik S. Jensen, Roskilde (DK); John Ejrup Olsen, Copenhagen N (DK)

(73) Assignee: ICOPAL APS

( * ) Notice: Subject to any disclaimer, the term of this patent is extended or adjusted under 35 U.S.C. 154(b) by 1055 days.

(21) Appl. No.: 16/331,174

(22) PCT Filed: Sep. 7, 2017

(86) PCT No.: PCT/EP2017/072452
§ 371 (c)(1),
(2) Date: Mar. 7, 2019

(87) PCT Pub. No.: WO2018/046593
PCT Pub. Date: Mar. 15, 2018

(65) Prior Publication Data
US 2019/0255810 A1    Aug. 22, 2019

(30) Foreign Application Priority Data

Sep. 7, 2016   (DK) .............. PA201670685

(51) Int. Cl.
| | | |
|---|---|---|
| *B32B 11/02* | (2006.01) | |
| *C08K 3/013* | (2018.01) | |
| *B32B 11/04* | (2006.01) | |
| *B32B 11/10* | (2006.01) | |
| *B32B 11/12* | (2006.01) | |
| *C08K 5/00* | (2006.01) | |
| *C08L 9/06* | (2006.01) | |
| *C08L 95/00* | (2006.01) | |
| *B32B 27/08* | (2006.01) | |
| *B32B 5/30* | (2006.01) | |
| *B32B 27/12* | (2006.01) | |
| *B32B 27/32* | (2006.01) | |
| *D06N 5/00* | (2006.01) | |
| *E04D 5/02* | (2006.01) | |
| *B32B 27/14* | (2006.01) | |
| *B32B 27/30* | (2006.01) | |
| *E04D 5/06* | (2006.01) | |

(Continued)

(52) U.S. Cl.
CPC ............ *B32B 11/02* (2013.01); *B32B 5/02* (2013.01); *B32B 5/16* (2013.01); *B32B 5/26* (2013.01); *B32B 5/30* (2013.01); *B32B 11/046* (2013.01); *B32B 11/10* (2013.01); *B32B 11/12* (2013.01); *B32B 27/08* (2013.01); *B32B 27/12* (2013.01); *B32B 27/14* (2013.01); *B32B 27/302* (2013.01); *B32B 27/32* (2013.01); *C04B 14/04* (2013.01); *C04B 14/24* (2013.01); *C04B 20/1033* (2013.01); *C04B 20/1044* (2013.01); *C04B 20/1074* (2013.01); *C04B 26/26* (2013.01); *C08K 3/013* (2018.01); *C08K 5/0016* (2013.01); *C08L 9/06* (2013.01); *C08L 95/00* (2013.01); *C09D 195/00* (2013.01); *D06N 5/003* (2013.01); *E04D 5/02* (2013.01); *E04D 5/06* (2013.01); *B32B 2255/02* (2013.01); *B32B 2255/26* (2013.01); *B32B 2255/28* (2013.01); *B32B 2260/021* (2013.01); *B32B 2260/042* (2013.01); *B32B 2260/046* (2013.01); *B32B 2262/0276* (2013.01); *B32B 2262/065* (2013.01); *B32B 2262/101* (2013.01); *B32B 2264/025* (2013.01); *B32B 2264/10* (2013.01); *B32B 2264/101* (2013.01); *B32B 2264/104* (2013.01); *B32B 2264/108* (2013.01); *B32B 2270/00* (2013.01); *B32B 2307/30* (2013.01); *B32B 2307/304* (2013.01); *B32B 2307/3065* (2013.01); *B32B 2307/72* (2013.01); *B32B 2307/732* (2013.01); *B32B 2315/08* (2013.01); *B32B 2419/06* (2013.01); *C04B 2111/27* (2013.01); *C08L 2203/12* (2013.01); *C08L 2555/50* (2013.01); *C08L 2555/84* (2013.01); *C08L 2555/86* (2013.01); *C09K 2200/0607* (2013.01); *C09K 2200/069* (2013.01); *Y02W 30/91* (2015.05); *Y10T 428/141* (2015.01)

(58) Field of Classification Search
None
See application file for complete search history.

(56) References Cited

U.S. PATENT DOCUMENTS

| | | | |
|---|---|---|---|
| 2010/0316866 A1 | 12/2010 | Drigo et al. ................... | 428/328 |
| 2015/0376456 A1* | 12/2015 | Luccarelli ................ | C08K 7/02 |
| | | | 156/60 |
| 2017/0002566 A1* | 1/2017 | Minot ....................... | E04D 5/02 |

FOREIGN PATENT DOCUMENTS

| | | |
|---|---|---|
| DE | 43 40 339 A1 | 6/1995 |
| EP | 2 264 094 A1 | 12/2010 |

(Continued)

OTHER PUBLICATIONS

Seo et al., KR 101072408 B1, Oct. 11, 2011 (machine translation) (Year: 2011).*

(Continued)

Primary Examiner — Cheng Yuan Huang
(74) Attorney, Agent, or Firm — OSTROLENK FABER LLP (57) ABSTRACT

A waterproofing membrane including a reinforcing material coated with a blend formulation, the blend formulation including glass spheres having a particle size between 0.25-0.50 mm and a particle density between 0.5-0.8 g/cm$^3$.

40 Claims, 2 Drawing Sheets

(51) Int. Cl.
  *B32B 5/26* (2006.01)
  *B32B 5/02* (2006.01)
  *C09D 195/00* (2006.01)
  *B32B 5/16* (2006.01)
  *C04B 20/10* (2006.01)
  *C04B 26/26* (2006.01)
  *C04B 14/04* (2006.01)
  *C04B 14/24* (2006.01)
  *C04B 111/27* (2006.01)

(56) References Cited

FOREIGN PATENT DOCUMENTS

| EP | 2 878 624 | A1 | 6/2015 |
|---|---|---|---|
| FR | 2 882 759 | B1 | 5/2008 |
| IT | 1400390 | B1 | 5/2013 |
| IT | 1400391 | B1 | 5/2013 |
| KR | 101072408 | B1 * | 10/2011 |
| RU | 2011154 | C1 | 4/1994 |
| RU | 2263186 | C1 | 10/2005 |

OTHER PUBLICATIONS

Holland, et al. DE 4340339, Jun. 1, 1995 (machine translation) (Year: 1995).*
Search Report dated Oct. 7, 2019 in corresponding Russian Patent Application No. 2019110145.
International Search Report dated Dec. 20, 2017 in corresponding PCT International Application No. PCT/EP2017/072452.
Written Opinion dated Dec. 20, 2017 in corresponding PCT International Application No. PCT/EP2017/072452.

* cited by examiner

LIGHTWEIGHT FILLER FOR WATERPROOFING BITUMEN MEMBRANES

CROSS-REFERENCE TO RELATED APPLICATIONS

The present application is a 35 U.S.C. §§ 371 national phase conversion of PCT/EP2017/072452, filed Sep. 7, 2017, which claims priority to Danish Patent Application No. PA201670685, filed Sep. 7, 2016, the contents of both of which are incorporated herein by reference. The PCT International Application was published in the English language.

The present invention relates to new lightweight waterproofing bitumen membranes for protecting buildings or bridges or the like, such as roofing felt. The lightweight membranes have shown beneficial thermal properties and flow properties which result in more efficient and secure installation. Furthermore the membranes have strong fire resistant properties.

BACKGROUND

Bitumen waterproofing membranes are layered structures comprising a reinforcing material covered with one or more blends positioned above and below the reinforcing material. As a top layer, slates or granules are normally found. The waterproofing properties are obtained by the bitumen content. Adding plastomers and elastomers may improve the performance of the bitumen with regard to elasticity, heat resistance and durability.

The waterproofing membranes are traditionally provided in the form of a wrapped, finished product that weighs between 30 and 45 kg per unit. The length of the unwrapped product is 5 to 10 meters, and the standard width is 1 meter. Generally, the higher the roll weight is, the less square metre of product will be transported per truck. This renders the products troublesome to handle if the membranes are too heavy, and the handling may cause excessive loads for one person alone. Often an extra person is needed for carrying the product to the site of use and for applying the products. One could consider reducing the roll length, thereby reducing the total weight. However, the installation, on e.g. a roof surface, will result in more joints and detailing, which requires much more time to finish the job.

A special problem during production, where the bitumen containing blend is in a liquid state due to the elevated temperatures during production, is the application of the bitumen blend formulation to the reinforcing material. If the bitumen blend formulation is too viscous, the layer applied will be too thick or the energy consumption of the production process will be unacceptable. If the viscosity is too low, the layer applied will be too thin and difficult to process. The correct thickness of the membrane is very important, since there are regulatory specifications in this regard in many countries.

EP 2 264 094 discloses waterproofing membranes consisting of a reinforcing material impregnated with a bitumen formulation comprising industrial bitumen, a mineral filler, a thermoplastic polymer or a mixture of thermoplastic polymers. The membranes are characterised in that the mineral filler consists of hollow glass microspheres with a density of between 0.10 and 0.14 g/cm$^3$ and a size of less than 120 µm in order to reduce the weight. One of the disclosed membrane products contains 96.1% w/w of bitumen and plasticizer blend, and 3.9% w/w of hollow glass microspheres. Disclosed properties of this product are cold bending of −25 degrees Celsius and a density of 750 g per square meters per millimetre thickness of the membrane (0.75 g/cm$^3$).

However, when trying to reproduce this kind of recipe it was observed that the elastic recovery property was affected too much. Surprisingly, the cold bending properties of the membrane did not comply with the disclosed values. Moreover, it was observed during the installation by torching of the membrane that the hollow glass microspheres were affected by the high temperature (some unusual crackling sound was heard) and were no longer participating to fix the proper viscosity of the torching bituminous blend. As a result, the bituminous blend can become too fluid and flow away instead of allowing good bonding of the membrane to the support. The product collapsed and did not result in the right thickness.

IT 1400391 discloses bitumen formulations as disclosed in EP 2 264 094 with cenosphere added in the blend. IT 1400390 discloses bitumen formulations with slightly larger glass peals compared to the disclosure in EP 2 264 094. FR2882759 also discloses bitumen formulations with small glass pearls.

DESCRIPTION OF THE INVENTION

An object of the invention is to provide a waterproofing membrane which may be handled by one person alone, keeping the geometrical characteristics of the product, such as the thickness and the length, without compromising the strength or performance or installation properties of the product.

Disclosed herein is in a first aspect of the invention a waterproofing membrane comprising a reinforcing material coated and/or impregnated with a blend formulation. The blend formulation comprises:
- 50-90% w/w bitumen or 50-90% w/w mix of bitumen and plasticizer;
- 2-25% w/w elastomeric block co-polymer and/or ter-polymer and/or 2-40% w/w plastomeric block co-polymer and/or ter-polymer; and
- 5-45% w/w glass spheres having a particle size between 0.25-0.50 mm and a particle density between 0.5-0.8 g/cm$^3$.

Disclosed herein is in a second aspect of the invention the use of a blend formulation in the production of a waterproofing membrane, the blend formulation comprising:
- 50-90% w/w bitumen or 50-90% w/w mix of bitumen and plasticizer;
- 2-25% w/w elastomeric block co-polymer and/or ter-polymer and/or 2-40% w/w plastomeric block co-polymer and/or ter-polymer; and
- 5-45% w/w glass spheres having a particle size between 0.25-0.50 mm and a particle density between 0.5-0.8 g/cm$^3$.

Disclosed herein is in a third aspect of the invention a blend formulation for use in the production of a waterproofing membrane, the blend formulation comprising:
- 50-90% w/w bitumen or 50-90% w/w mix of bitumen and plasticizer;
- 2-25% w/w elastomeric block co-polymer and/or ter-polymer and/or 2-40% w/w plastomeric block co-polymer and/or ter-polymer; and
- 5-45% w/w glass spheres having a particle size between 0.25-0.50 mm and a particle density between 0.5-0.8 g/cm$^3$.

When reference is made to the particle size, reference is made to the average diameter of the particles. The particle size may be obtained e.g. by sieving or laser diffraction.

By the blend formulation according to the first, second and third aspects of the invention, a material having improved fire resistance properties is obtained compared to formulations with different kinds of pearls. The impregnation properties of the blend formulation further improves the reinforcement properties.

By using the glass spheres compared to conventional fillers, a lighter product is obtained which has good fire properties.

Also, the low weight of the glass pearls insures that a decrease in weight of rolls of waterproofing membranes is obtained keeping the length unchanged. The weight reduction will reduce the freight costs when transporting the material and thus increase the transported square metre per truck.

Further, when producing the membranes, the properties of the glass spheres in terms of density and particle size, ensures that the viscosity of the blend is significantly lower than observed with smaller and lower density glass spheres. This makes the blend formulation easier to use in the factory during production and in the installation of the final product.

Additionally, the ageing of the membranes are prolonged as the flow temperature is higher with the above formulation and the temperature at which the material breaks is lowered.

Bitumen blend formulations according to the invention have lower heat transfer than standard bitumen blend formulations with or without conventional fillers. Thus, the calories will be concentrated in the bitumen to be melted. By calories is meant energy e.g. in the form of heat from flame or hot air possibly during a welding process.

The glass pearls used in the blend according to the invention will normally have a thermal conductivity below 0.1 W/m·K, whereas the thermal conductivity of conventional fillers such as limestone fillers is in the order of 5 W/m·K. The use of glass pearls in the blend formulation consequently leads to improved thermal insulation properties, which leads to improved installation properties. The increased thermal insulation gives slower heat transfer to the surface of the waterproofing membrane. This in turn results in the occurrence of less footprints and pressure marks on the waterproofing membrane providing the membrane with a more attractive physical appearance in addition to improving the strength and durability of the waterproofing membrane. By the blend formulation is further obtained better rheological properties of the waterproofing membrane.

DESCRIPTION OF PREFERRED EMBODIMENTS

Disclosed herein is in a first aspect of the invention a waterproofing membrane comprising a reinforcing material coated and/or impregnated with a blend formulation. The blend formulation comprises:

50-90% w/w bitumen blend or 50-90% w/w mix of bitumen and plasticizer;

2-25% w/w elastomeric block co-polymer and/or ter-polymer and/or 2-40% w/w plastomeric block co-polymer and/or ter-polymer; and 5-45% w/w glass spheres having a particle size between 0.25-0.50 mm and a particle density between 0.5-0.8 g/cm$^3$.

The glass pearls used in the blend formulation may be a recycled material. Thus, the present invention includes the use of recycled material to obtain a lightweight membrane with equivalent geometrical characteristics. Furthermore, conventional techniques to manufacture the membrane rolls are still possible.

In the present context, the term "reinforcing material" is used to designate lengths used for carrying and supporting the blend formulation during manufacture and in use. The reinforcing material may be made from natural and/or synthetic materials, typically fibres, such as jute, glass or a polymer fibre, such as polyester fibre.

The bitumen used in accordance with the present invention may be distilled grades having a relatively high penetration, or air blown bitumen having higher softening point temperatures. The quality of bitumen is chosen in accordance with the usual knowledge of the skilled person in accordance with the intended use of the product. Thus, the bitumen grades suitable for use in the present invention have a penetration of 35-50, 50-70, 70-100, 100-150 or 160-220. Air blown bitumen suitable for use in the present invention have grades (softening point/penetration) of 85/25, 95/35, 100/15, 100/40, 88/40, 90/40, 95/40 or 115/15.

The term blend may be used interchangeably with the term coating. By both of the terms "coating" and "blend" is in the concept of the invention according to all aspects meant a product, which is solid at room temperature. In order for the blend according to this invention to be liquid, heating to around 180° C. is required. The blend consequently normally contains no solvents.

In one or more embodiments, the blend formulation is solid at room temperature.

In one or more embodiments, the blend formulation has a softening point of at least 70° C. at fresh state.

In one or more embodiments, the blend formulation has a softening point of at least 80° C. at fresh state.

In one or more embodiments, the blend formulation has a softening point of at least 90° C. at fresh state.

In one or more embodiments, the blend formulation has a softening point of at least 100° C. at fresh state.

In one or more embodiments, the blend formulation has a cold bending property of −20° C. or lower at fresh state.

In one or more embodiments the blend formulation has a cold bending property between −20° C. and −40° C. at fresh state.

In one or more embodiments, the blend formulation has a softening point between 70 and 175° C. at fresh state.

In one or more embodiments, the blend formulation comprises 50-90% w/w bitumen and 0% w/w mix of bitumen and plasticizer.

In one or more embodiments, the blend formulation comprises 60-80% w/w bitumen and 0% w/w mix of bitumen and plasticizer.

In one or more embodiments, the blend formulation comprises 65-75% w/w bitumen and 0% w/w mix of bitumen and plasticizer.

In one or more embodiments, the blend formulation comprises 70-75% w/w bitumen and 0% w/w mix of bitumen and plasticizer.

In one or more other embodiments, the blend formulation comprises 50-90% w/w mix of bitumen and plasticizer. In these embodiments there is 0% w/w pure bitumen.

In one or more other embodiments, the blend formulation comprises 60-80% w/w mix of bitumen and plasticizer. In these embodiments there is 0% w/w pure bitumen.

In one or more other embodiments, the blend formulation comprises 65-75% w/w mix of bitumen and plasticizer. In these embodiments there is 0% w/w pure bitumen.

In one or more other embodiments, the blend formulation comprises 70-75% w/w mix of bitumen and plasticizer. In these embodiments there is 0% w/w pure bitumen.

In the present context, the term "plasticizer" designates a bitumen compatible oil. Such oil can be pure aromatic, naphthenic or paraffinic oil or a mixture of two or more of those, flux oil, non-naphthenic vacuum residue oils, e.g. recycled residue oil from lubricant oil, or vegetable oil preferably having a high compatibility with the elastomeric block co-polymer and/or ter-polymer and/or the plastomeric block co-polymer and/or ter-polymer.

The bitumen grades with a penetration of up to 300 or 600 is possible with using bitumen and plasticizer mixes.

A plasticizer may be present in an amount up to 25% w/w and suitably in an amount up to 20% w/w depending on the bitumen grade, the polymer type, the properties and the amount of glass pearls used.

For some embodiments of the invention, a plasticizer in an amount of between 7-10% w/w in combination with hard 70/100 bitumen has been found to produce the desired properties.

The inventors have found that one can define a correct mix of "bitumen and plasticizer" characterized by the range of penetration giving the best compatibility and the desired properties of the formulation; and giving the desired properties to the waterproofing membrane.

Hence, in one or more embodiments, the blend formulation comprises plasticizer in an amount of 0-25% w/w, such as within the range of 5-25% w/w, e.g. within the range of 10-25% w/w, such as within the range of 15-25% w/w, e.g. within the range of 20-25% w/w.

The filler material used in accordance with the present invention may be glass pearls alone or a combination of glass pearls and a conventional mineral filler material in order to reduce the weight of the finished product without compromising the strength and performance of the product.

The conventional mineral filler may e.g. be limestone (calcium carbonate) in an amount of up to 15% w/w, such as within the range of 1-15% w/w, e.g. within the range of 2-10% w/w, such as within the range of 5-8% w/w, e.g. within the range of 6-7% w/w.

In one or more embodiments, the blend formulation further comprises up to 15% w/w conventional mineral filler.

Alternatively, a combination of 1) glass pearls and an alternative filler or 2) glass pearls, an alternative filler and conventional mineral filler material can be used. Examples of alternative fillers are poly(methyl methacrylate) (PMMA), petcoke, bedcoke, and perlite.

In one or more embodiments, the blend formulation further comprises up to 15% w/w alternative filler.

In one or more embodiments, the alternative filler is poly(methyl methacrylate), petcoke, bedcoke, or perlite.

Alternatively, fire-retardant additives such as colemanite in powder form mixed in the blend or graphite spread on the reinforcement could also be used.

It is preferred that the blend formulation comprises an elastomeric block co-polymer and/or ter-polymer and/or a plastomeric co-polymer and/or ter-polymer in order to improve the properties and performance thereof in a manner known per se.

In one or more embodiments, the blend formulation comprises 2-25% w/w elastomeric block co-polymer and/or ter-polymer and/or 2-40% w/w plastomeric co-polymer and/or ter-polymer.

In one or more embodiments, the blend formulation comprises 5-20% w/w elastomeric block co-polymer and/or ter-polymer and/or 5-35% w/w plastomeric co-polymer and/or ter-polymer In one or more embodiments, the blend formulation comprises 8-12% w/w elastomeric block polymer and/or 8-30% w/w plastomeric co-polymer and/or ter-polymer.

In one or more embodiments, the blend formulation comprises either an elastomeric block co-polymer and/or ter-polymer or a plastomeric co-polymer and/or ter-polymer. Thus, only elastomeric or plastomeric polymers are used.

In one or more embodiments of the invention, the elastomeric block co-polymer and/or ter-polymer is a thermoplastic polymer. Examples of thermoplastic polymers include Styrene-Butadiene-Styrene (SBS), Styrene-Isoprene-Styrene (SIS), Styrene-Ethylene-Butadiene-Styrene (SEBS), Styrene-Butadiene (SB) and mixtures thereof.

In one or more embodiments of the invention, the elastomeric block co-polymer and/or ter-polymer is selected from the group consisting of Styrene-Butadiene-Styrene (SBS), Styrene-Isoprene-Styrene (SIS), Styrene-Ethylene-Butadiene-Styrene (SEBS), Styrene-Butadiene (SB) and mixtures thereof.

In one or more embodiments of the invention, the elastomeric block polymer is Styrene-Butadiene-Styrene (SBS).

In one or more embodiments of the invention, the plastomeric block co-polymer and/or ter-polymer belongs to the group of low-density polyethylene, high-density polyethylene, atactic polypropylene, amorphous polyalfaolefin (APAO), isotactic polypropylene, ethylene/propylene copolymer, liquid low molecular polymer, ethylene/propylene/(poly)butene terpolymer and mixtures thereof.

The plastomeric polymer is preferably atactic polypropylene (APP) in combination with the other described above.

In one or more embodiments of the invention, the plastomeric polymer is atactic polypropylene (APP).

In one or more embodiments of the invention, the blend formulation has a density of 0.8-1.2 g/cm$^3$ for an elastomeric block co-polymer and/or ter-polymer-modified membrane, and a density of 0.85-1.0 g/cm$^3$ for a plastomeric co-polymer and/or ter-polymer-modified membrane.

In one or more embodiments, the waterproofing membrane has a density of 800-1200 g/m$^2$ per mm of membrane thickness for a elastomeric block co-polymer and/or ter-polymer-modified membrane and a density of 850-1000 g/m$^2$ per mm for a plastomeric co-polymer and/or ter-polymer-modified membrane.

It has been found suitable that the polymer is present in an amount of approximately 4% to 40% of the bitumen formulation (excluding filler).

In one or more embodiments of the invention, the blend formulation comprises 10-40% w/w glass spheres.

In one or more embodiments of the invention, the blend formulation comprises 10-35% w/w glass spheres.

In one or more embodiments of the invention, the blend formulation comprises 10-30% w/w glass spheres.

In one or more embodiments of the invention, the blend formulation comprises 10-25% w/w glass spheres.

In one or more embodiments of the invention, the blend formulation comprises 12-20% w/w glass spheres.

In one or more embodiments of the invention, the blend formulation comprises 15-17% w/w glass spheres.

Figure 1:
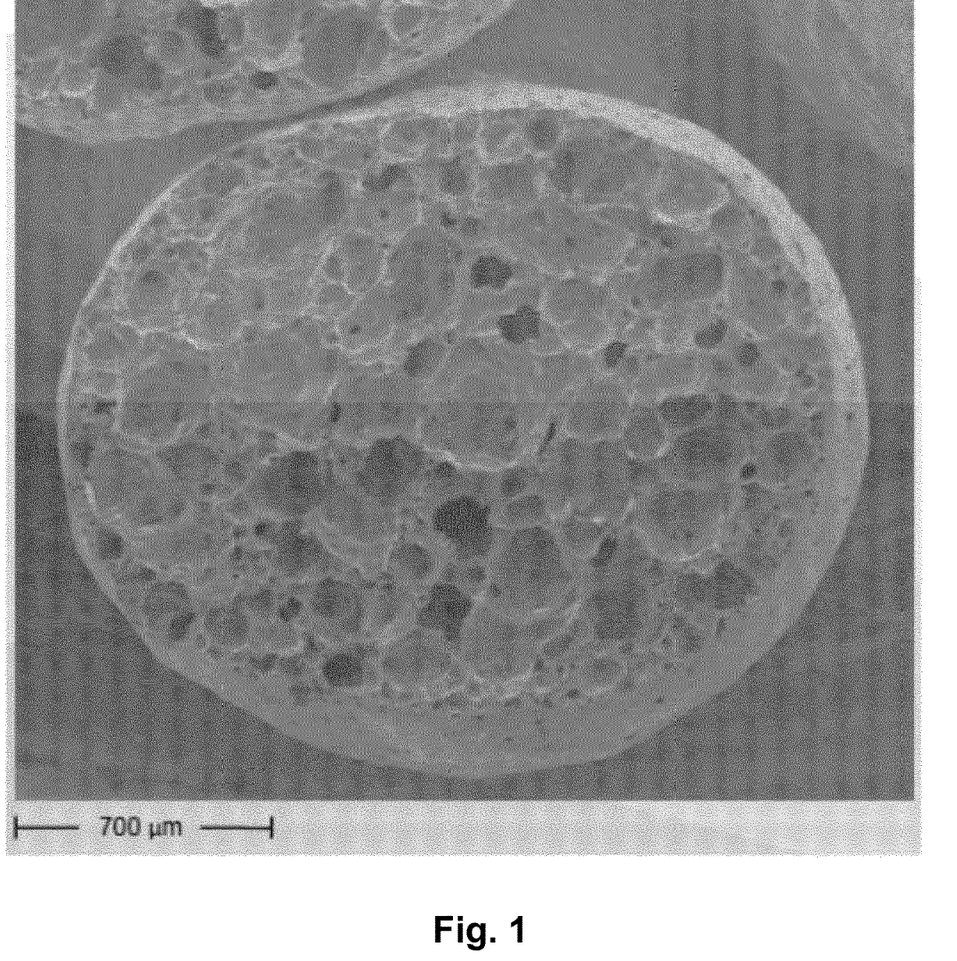
FIG. 1 shows an image of a glass sphere according to the invention.

In one or more embodiments of the invention, the glass spheres have a porous internal structure Alternatively, hollow glass pearls can be used. An example of a pearl having an internal structure is shown in FIG. 1, where it can be seen that the interior of the glass sphere is filled with air pockets making it neither hollow nor solid but porous. The air pocket are normally only filled with atmospheric air.

The surface of the glass sphere is normally somewhat smooth.

In one or more embodiments, the blend formulation is impregnated into the reinforcement material.

In one or more embodiments coated onto a top side of the reinforcement material and/or on a bottom side of the reinforcement material.

In one or more embodiments, the blend formulation is impregnated into the reinforcement material and further a blend formulation is coated onto a top side of the reinforcement material and/or on a bottom side of the reinforcement material.

In one or more embodiments, the reinforcement layer may be coated and/or impregnated with the same blend formulation.

In one or more embodiments of the invention, the waterproofing membrane may further comprise a reinforcement layer positioned between two layers comprising the blend formulation. Thereby the blend formulation is coated and/or impregnated onto a top side of the reinforcement material and on a bottom side of the reinforcement material.

In one or more embodiments, the reinforcement layer may be coated and/or impregnated with three different varieties of the blend formulations. Thus, the blend formulation on the top side of the reinforcement material may be different from that on the bottom side of the reinforcement material and/or the blend formulation impregnated into the reinforcement material.

In one or more embodiments, all blend formulations comprises:
- 50-90% w/w bitumen or 50-90% w/w mix of bitumen and plasticizer;
- 2-25% w/w elastomeric block co-polymer and/or ter-polymer and/or 2-40% w/w plastomeric block co-polymer and/or ter-polymer; and
- 5-45% w/w glass spheres having a particle size between 0.25-0.50 mm and a particle density between 0.5-0.8 g/cm$^3$.

In other embodiments, one or two of the blend formulations in the waterproofing membrane may be different e.g. not comprising glass pearls.

A blend formulation according to the invention may be prepared by a manner known per se. The order of blending may be that the glass pearls are admixed to a mix of bitumen, plasticizer, and elastomeric block co-polymer and/or ter-polymer and/or plastomeric co-polymer and/or ter-polymer. The mixing temperature and time and the degree of shear (high and low) used in the individual steps depend on the grade of bitumen and polymer used as well as the amounts of the individual constituents, which are determined as a matter of routine by the person skilled in the art.

Figure 2:
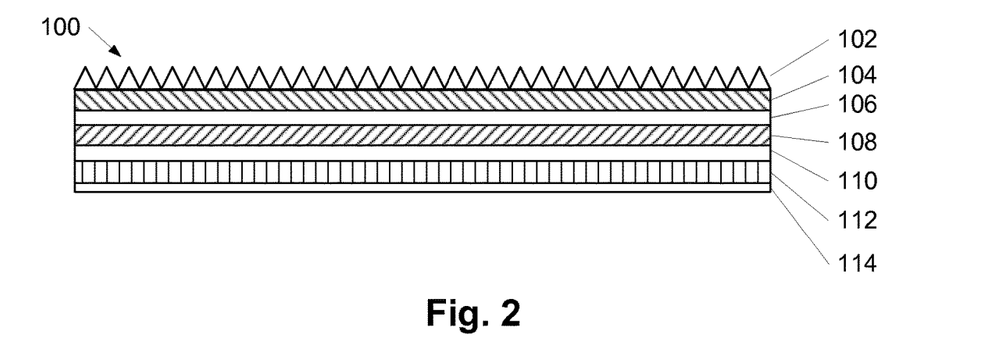
FIG. 2 shows a side-view of the layers of a bitumen waterproofing membrane.

FIG. 2 shows a side-view of the layers of a bitumen waterproofing membrane 100 comprising a number of layers. As a top layer 102 is normally found slates or granulates.

The terms top layer and lowest layer refers to the positioning of the bitumen waterproofing membrane 100 when installed on e.g. rooftops of buildings.

The bitumen waterproofing membrane 100 also comprises a reinforcing material 106, which is positioned between two blend layers 104, 108. The reinforcing material 106 may be impregnated with a blend formulation according to the invention.

The term blend may be used interchangeably with the term coating. By both of the terms "coating" and "blend" is meant a product, which is solid at room temperature enabling it to be applied on both sides of the reinforcing material 106 in the waterproofing membrane 100. In order for the blends 104, 108 of the invention to be liquid, heating to around 180° C. is required. The blends 104, 108 contain normally no solvents.

The two blend layers 104, 108 may have the same blend formulation or alternatively be different.

In addition, the reinforcing material 106 may be impregnated with an additional blend, which can be either the same as the previously mentioned blends 104, 108 or a different one. For the blend possibly use for impregnating the reinforcement layer heating to around 180° C. is normally also required for it to be liquid. The blend used in the layer 106 contains normally no solvents.

When reference is made to blend formulations according to inventions, it refers to at least one of the blend formulations in layer 104, 106 and/or 108.

Below the blend layer 108 in the waterproofing membrane 100 is found a separation layer 110, a torching layer 112 and a torching foil layer 114. Normally, the torching foil layer 114 is the bottom most layer, which will be in direct contact with the surface onto which the waterproofing membrane 100 is installed. The separation layer 110 may be a sand layer. Other materials may also be used. On top of the top side blend layer 104 may be found a layer of granules or slate 102. Alternatively, the layer 102 may be a fleece or a paint layer, the latter e.g. an acrylic based paint, polyvinyl alcohol paint, polyvinyl butyral paint or similar.

By having the waterproofing membrane designed with a layered structure, the installation process will benefit from a structure with higher thermal insulation in one layer which leads to higher calorie concentration in the welding zone around the torching blend and foil 112, 114.

In one or more embodiments, the waterproofing membrane further comprising a torching foil as the bottom most layer in the waterproofing membrane. Examples of torching foil materials include polypropylene films, polyethylene films, paints and similar.

In one or more embodiments, the waterproofing membrane further comprising a torching layer positioned between the torching foil and the reinforcement layer. Nonelimiting examples of torching blends for the torching layer include APP/SBS blends, SBS/nonfillerised or fillerised Self Adhesive blends, or SBS/Oxidized (air blown) bitumen blends.

In one or more embodiments, the waterproofing membrane further comprising a separation layer positioned between the torching layer and the reinforcement layer, wherein the reinforcement layer is possibly coated and/or impregnated with the blend formulation on the bottom side.

In one or more embodiments, the separation layer is a sand layer.

In one or more embodiments, the separation layer is paint layer. The paint layer may be acrylic based paint, PVB, and/or PVA based.

In one or more embodiments, the waterproofing membrane further comprising a layer of granules or slate positioned as the top most layer in the waterproofing membrane. Alternatively fleece or paint may be found as the top most layer.

Figure 3:
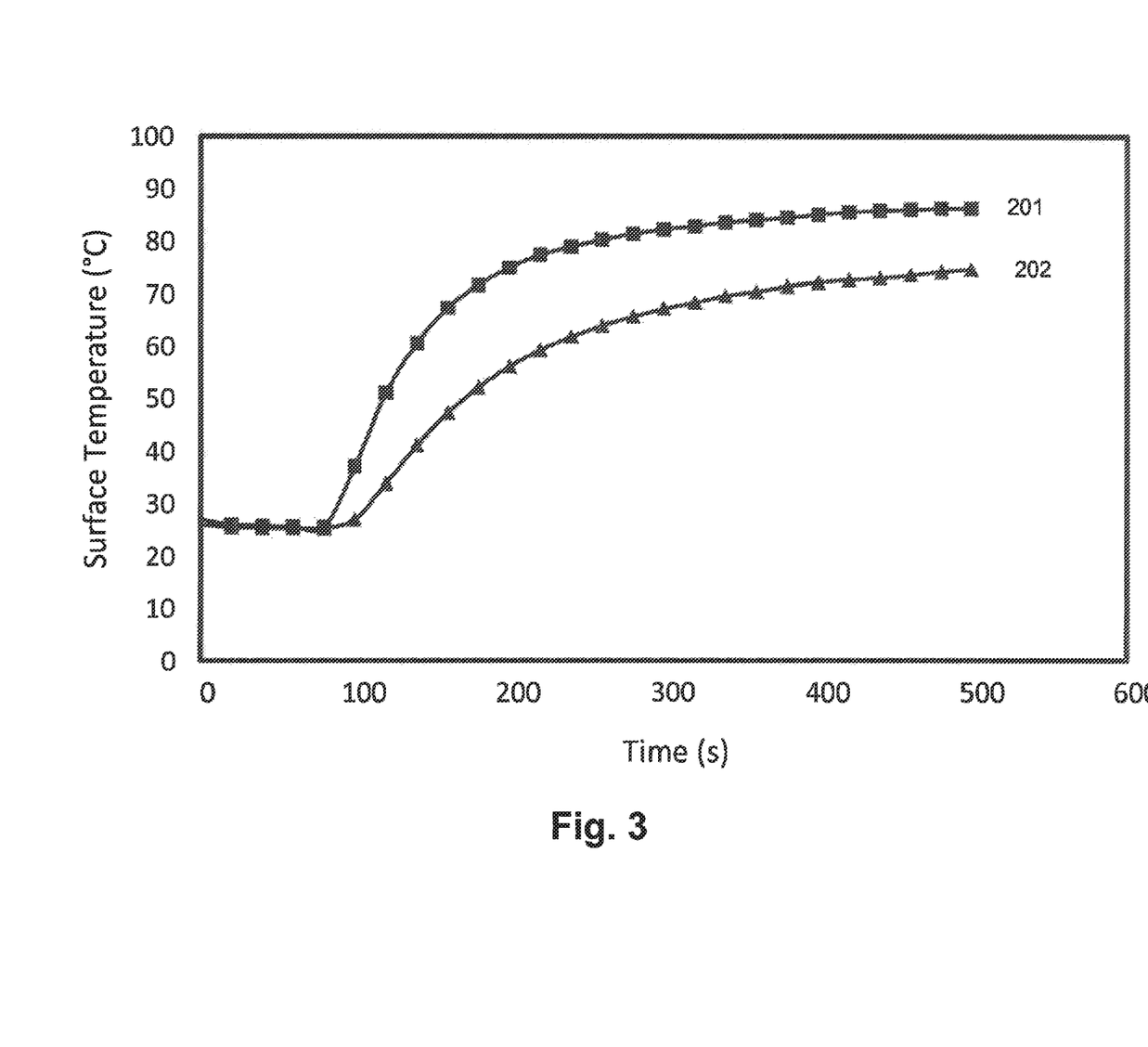
FIG. 3 shows the surface temperature for waterproofing membranes.

FIG. 3 shows the surface temperature for waterproofing membranes with one or more blends according to the invention 202 and one with a conventional filler in the blends 201.

Disclosed herein is in a second aspect of the invention the use of a blend formulation according to the above in the production of a waterproofing membrane, the blend/impregnation formulation as described above.

Disclosed herein is in a third aspect of the invention a blend formulation according to the above for use in the production of a waterproofing membrane, the blend/impregnation formulation as described above.

It should be noted that embodiments and features described in the context of one of the aspects of the present invention also apply to the other aspects of the invention. Thus, embodiments and features relating to the blend formulation and described in the context of the first aspect of the invention, also apply to the second and the third aspects of the invention.

The invention will now be described in further details in the following non-limiting examples.

DESCRIPTION OF THE PREFERRED EMBODIMENTS

The materials and methods used when performing the below working examples are stated below.

Bitumen: Nytop 210 from Nynas, 70/100 from Exxon, 160/220 from Leuna
SBS copolymer: KD 1184 Kraton
Plasticizer: 700 SR from Huile Eco Staining was determined as described in EN 13301. Cold Bending was determined as described in standard EN 1109. Density was determined using a pycnometer. Penetration was determined according to the standard EN 1426. Ring & ball was determined according to the standard EN 1427. Viscosity was determined using a Brookfield viscometer. The flow was determined according to an internal method. Ageing was performed using an oven according to EN 1296.

Preparation of Blend Formulations.

Generally, the blend formulations of the present invention can be prepared by the following recipe:
- 50-90% w/w bitumen or 50-90% w/w mix of bitumen and plasticizer;
- 2-25% w/w elastomeric block co-polymer and/or ter-polymer and/or 2-40% w/w plastomeric block co-polymer and/or ter-polymer; and
- 5-45% w/w glass spheres having a particle size between 0.25-0.50 mm and a particle density between 0.5-0.8 g/cm$^3$.

Normally, the elastomeric block co-polymer and/or ter-polymer is Styrene-Butadiene-Styrene (SBS), Styrene-Isoprene-Styrene (SIS), Styrene-Ethylene-Butadiene-Styrene (SEBS), or Styrene-Butadiene (SB) and/or mixtures thereof.

Normally, the plastomeric block co-polymer and/or ter-polymer is low-density polyethylene, high-density polyethylene, atactic polypropylene, amorphous polyalfaolefin, isotactic polypropylene, ethylene/propylene copolymer, liquid low molecular polymer, or ethylene/propylene/(poly)butene terpolymer, and/or mixtures thereof.

Blends formulations were prepared by standard blending methods at 200° C.

The blend formulations of the references are prepared in the similar manner with the composition of the blend formulation, expressed as a % by weight is listed in the tables.

Experiments 1-2

The testing results of experiments 1 and 2 at fresh state and after ageing at 80° C. are presented in the below Table 1. The results show that the viscosity of the materials using glass pearls according to the invention (Ex. 1) is somewhat lower than for the material, where a conventional filler, such as limestone, giving a higher density is used (Ex. 2). The cold bending properties are improved when using the glass pearls compared to the limestone filler, which can be observed by the maintaining of a lower value during ageing for the blend formulation of the invention (Ex. 1) compared to that with limestone filler (Ex. 2). The small amount of limestone in Ex. 1 reflects an impurity in the sample. Both examples 1 and 2 have been produced in a factory.

TABLE 1

|  | Example 1 | | | | Example 2 | | | |
| --- | --- | --- | --- | --- | --- | --- | --- | --- |
| Bitumen | 69.36 | | | | 52.68 | | | |
| SBS elastomeric block polymer | 9.64 | | | | 7.32 | | | |
| Glass Pearls | 14 | | | | — | | | |
| Limestone | 7 | | | | 40.00 | | | |
| Ageing at 80° C. | 0 | 1 m | 2 m | 3 m | 0 | 1 m | 2 m | 3 m |
| Softening point (R&B (° C.)) | 132 | 111 | 102 | 100 | 132 | 112 | 100 | 100 |
| Penetration 25° C. (1/10 mm) | 38 | — | 28 | 19 | 32 | 23 | 19 | 11 |
| Penetration 50° C. (1/10 mm) | 74 | — | 79 | 77 | 80 | 66 | 63 | 57 |
| EN 13301 (staining) | 6 | 17 | 17 | 16 | 11 | 7 | 14 | 12 |
| Cold Bending (° C.) | −26 | −24 | −24 | −18 | ≤−28 | >−18 | −14 | −10 |
| Density (g/cm$^3$) | 1.01 | | | | 1.31 | | | |
| Viscosity (cPo) @ 180° C. | 12680 | | | | 19540 | | | |
| Viscosity (cPo) @ 200° C. | 8250 | | | | 9290 | | | |

Experiments 3-6

Experiments 3-6 compare the difference of using the glass pearls according to the invention and micro glass pearls with a smaller density and particle size. The results shown in tables 3 and 4 show a significant lower viscosity for the formulations with the glass pearls according to the invention, which makes it easier to use the blend in the factory and to apply the product. Although the glass pearl ratio in Example 3 is higher than the ratio in Example 5, the viscosity is much lower in example 3 than in Example 5.

Examples 3 and 4 are laboratory blends and therefor gives slightly different results than Ex. 1 and 2. The type of bitumen is the same for examples 1 and 2. A slightly different type is used for examples 3-6, as the supplier of the bitumen is different.

TABLE 3

| | Glass Pearls: 0.70 g/cm³; 0.25-0.50 mm | | | | | | | |
|---|---|---|---|---|---|---|---|---|
| | Example 3 | | | | Example 4 | | | |
| Bitumen | 73.75 | | | | 80.78 | | | |
| Elastomeric block polymer: SBS | 10.25 | | | | 12.72 | | | |
| Glass Pearls | 16.00 | | | | 6.50 | | | |
| Limestone | — | | | | — | | | |
| Ageing at 80° C. | 0 | 1 m | 2 m | 3 m | 0 | 1 m | 2 m | 3 m |
| Softening point (R&B (° C.)) | 127 | 118 | 100 | 96 | 128 | 117 | 101 | 99 |
| Penetration 25° C. (¹/₁₀ mm) | 49 | 22 | 20 | 15 | 44 | 29 | 26 | 17 |
| Penetration 50° C. (¹/₁₀ mm) | 99 | 79 | 80 | 60 | 101 | 88 | 84 | 66 |
| EN 13301 (staining) | 0 | 0 | 11 | 10 | 2 | 9 | 7 | 7 |
| Cold Bending (° C.) | −20 | −14 | −12 | +2 | −24 | −18 | −6 | 4 |
| Density (g/cm³) | 0.83 | | | | 0.92 | | | |
| Viscosity (cPo) @ 180° C. | 7350 | | | | 6100 | | | |
| Viscosity (cPo) @ 200° C. | 3850 | | | | 4100 | | | |

TABLE 4

| | Glass Pearls: 0.25 g/cm³; 0.03-0.1 mm | | | | | | | |
|---|---|---|---|---|---|---|---|---|
| | Example 5 | | | | Example 6 | | | |
| Bitumen | 76.03 | | | | 67.39 | | | |
| Elastomeric block polymer: SBS | 11.97 | | | | 10.61 | | | |
| Glass Pearls | 12.00 | | | | 12.00 | | | |
| Limestone | | | | | 10.00 | | | |
| Ageing at 80° C. | 0 | 1 m | 2 m | 3 m | 0 | 1 m | 2 m | 3 m |
| Softening point (R&B (° C.)) | 136 | 129 | 112 | 104 | 138 | 127 | 112 | 105 |
| Penetration 25° C. (¹/₁₀ mm) | 34 | 23 | 21 | 18 | 34 | 23 | 19 | 17 |
| Penetration 50° C. (¹/₁₀ mm) | 67 | 61 | 60 | 59 | 67 | 60 | 56 | 56 |
| EN 13301 (staining) | 0 | 0 | 4 | 5 | 0 | 0 | 4 | 5 |
| Cold Bending (° C.) | −24 | −20 | −12 | −2 | −22 | −16 | −4 | 6 |
| Density (g/cm³) | 0.72 | | | | 0.76 | | | |
| Viscosity (cPo) @ 180° C. | 20000 | | | | 18600 | | | |
| Viscosity (cPo) @ 200° C. | 11500 | | | | 10300 | | | |

Experiments 7-8

Experiments 7-8 is focused at measuring the difference between the cold bending properties of the formulation on the overside and the underside along with the flow of the formulation. All the experiments are performed both at fresh state and after ageing. Measurement on three batches of membranes produced with formulation according to the invention are shown in Ex. 8 in Table 5 along with a set of reference measurements in Ex. 7. The examples are membranes produced either with the blend containing glass pearls (Ex. 8) or the standard blend (Ex. 7).

As can be seen in Table 5, the cold bending and the flow after ageing are better for the compositions according to the invention (Ex. 8) compared to the reference measurement (Ex. 7).

TABLE 5

| | | Ex. 7 | Ex. 8 (Glass pearls) | | |
|---|---|---|---|---|---|
| | | Reference | 1 | 2 | 3 |
| Bitumen | | 52.68 | 69.36 | 68.92 | 68.92 |
| Elastomeric block polymer | | 7.32 | 9.64 | 9.58 | 9.58 |

TABLE 5-continued

| | | Ex. 7 | Ex. 8 (Glass pearls) | | |
|---|---|---|---|---|---|
| | | Reference | 1 | 2 | 3 |
| Glass Pearls | | — | 14 | 14.5 | 14.5 |
| Limestone | | 40 | 7 | 7 | 7 |
| Cold Bending (° C.) | fresh state | −24 | ≤−28 | ≤−28 | ≤−28 |
| overside | after ageing* | −22 | ≤−28 | ≤−28 | ≤−28 |

TABLE 5-continued

|  |  | Ex. 7 | Ex. 8 (Glass pearls) | | |
|---|---|---|---|---|---|
|  |  | Reference | 1 | 2 | 3 |
| Cold Bending (° C.) | fresh state | −25 | ≤−28 | −26 | −26 |
| underside | after ageing* | −24 | ≤−28 | −26 | −24 |
| Flow (° C.) | fresh state* | 115 | 115 | 125 | 125 |
|  | after ageing | 110 | 110 | 115 | 115 |

*ageing: 12 weeks at 70° C.

Experiments 10-17

EN 1187-2 fire tests were performed on a top layer waterproofing membrane with the formulations given in table 6a-b, applied on an mineral wool insulation layer.

When having the same volume of filler as shown in examples 10-13 shown in table 6a, the material with the glass pearls according to the invention (Ex. 10) shows an improved degradation length compared to the experiments with the smaller glass pearls (Ex. 11 and 12). The degradation length using the limestone filler (Ex. 13) has a comparable degradation length with the glass pearls of the invention (Ex. 10). The product with the glass pearls according to the invention (Ex. 10) is however significantly lighter than the product with the limestone filler.

For experiments 14-17 with the same weight percent of filler as shown in table 6b, the material with the smallest density glass pearls (Ex. 16) shows the best degradation length compared to the other experiments (Ex. 14 and 17). The trend most likely reflect the fact that the volume of filler is significantly higher (so the volume of bitumen and SBS is lower) when the density of the filler is lowered thus there is less burnable part. However such high percentage of light pearls are inconvenient in regards to the resulting blend viscosity.

TABLE 6a

|  |  | Same volume of filler | | | |
|---|---|---|---|---|---|
|  |  | Ex. 10 | Ex. 11 | Ex. 12 | Ex. 13 |
| Bitumen + Plasticizer | | 73.75 | 82.21 | 83.70 | 50.61 |
| Elastomeric block polymer: SBS | | 10.25 | 11.42 | 11.63 | 7.03 |
| Glass Pearls | 0.70 g/cm³; 0.25-0.50 mm | 16.00 | | | |
|  | 0.25 g/cm³; 0.03-0.10 mm | | 6.37 | | |
|  | 0.18 g/cm³; 0.075 mm* | | | 4.67 | |
| Limestone | | | | | 42.35 |
| Degradation length (EN 1187-2 fire test) | | 46 | 53 | 51 | 45 |

*average

TABLE 6b

|  |  | Same wt % of filler | | | |
|---|---|---|---|---|---|
|  |  | Ex. 14 | Ex. 15 | Ex. 16 | Ex. 17 |
| Bitumen + Plasticizer | | 78.14 | 78.14 | 78.14 | 78.14 |
| Elastomeric block polymer: SBS | | 10.86 | 10.86 | 10.86 | 10.86 |
| Glass Pearls | 0.70 g/cm³; 0.25-0.50 mm | 11.00 | | | |
|  | 0.25 g/cm³; 0.03-0.10 mm | | 11.00 | | |
|  | 0.18 g/cm³; 0.075 mm* | | | 11.00 | |
| Limestone | | | | | 11.00 |
| Degradation length (EN 1187-2 fire test) | | 54 | 47 | 44 | 51 |

*average

Experiments 18 and 19 listed in table 7 show fire tests (EN 1187-2) results obtained with industrial top layers (reference in Ex. 18) and industrial product with glass pearls (Ex. 19) in blend blends. Both top layers are tested on mineral wool in a double layers system. The first layer used is a standard product.

TABLE 7

|  |  | Ex. 18 | Ex. 19 | |
|---|---|---|---|---|
|  |  | Reference | 1 | 2 |
| Bitumen | | 52.68 | 69.36 | 68.92 |
| Elastomeric block polymer | | 7.32 | 9.64 | 9.58 |
| Glass Pearls | | — | 14 | 14.5 |
| Limestone | | 40 | 7 | 7 |
| Degradation length (mm) | 2 m/s | 338 | 460 | 450 |
|  | 4 m/s | 358 | 410 | 400 |

Table 7 shows that the new product (Ex. 19) is as efficient as the standard product.

Both top layers have also been tested in a single layer system on mineral wool and the results are shown in table 8, where Ex. 20 is the reference and Ex. 21 are with glass pearls.

TABLE 8

|  |  | Ex. 20 | Ex. 21 | |
|---|---|---|---|---|
|  |  | Reference | 1 | 2 |
| Bitumen | | 52.68 | 69.36 | 68.92 |
| Elastomeric block polymer | | 7.32 | 9.64 | 9.58 |
| Glass Pearls | | — | 14 | 14.5 |
| Limestone | | 40 | 7 | 7 |
| Degradation length (mm) | 2 m/s | 442 | 448 | 455 |
|  | 4 m/s | 432 | 503 | 415 |

Table 8 shows that both products have the same fire resistance.

In one or more embodiments, the waterproofing membrane comprises a torching blend positioned on the underside of the bottom blend such that the torching blend is closest to the subject on which the waterproofing membrane is mounted compared to the reinforcing material.

The torching blend(s) may comprise glass pearls of the invention, limestone, other conventional or alternative fillers or a mixture thereof.

None-limiting examples of torching blends include APP/SBS blends, SBS/nonfillerised or fillerised Self Adhesive blends, or SBS/Oxidized (air blown) bitumen blends.

Table 9 below shows a comparison between the invention and a reference, where a bitumen and plasticizer mix is used. An alternative filler is further added to the blend.

From table 9, the lowering of the density of the blend when using glass pearls instead of limestone is clearly seen at the same time as the viscosity remains at comparable levels.

TABLE 9

| | Glass Pearls: 0.70 g/cm³; 0.25-0.50 mm | | | | | | | Reference | | | |
|---|---|---|---|---|---|---|---|---|---|---|---|
| | Example 22 | | | | Example 23 | | | | Example 24 | | |
| Bitumen | 62.37 | | | | 62.99 | | | | 47.20 | | |
| Plasticizer | 9.72 | | | | 8.10 | | | | 5.31 | | |
| SBS | 8.91 | | | | 8.91 | | | | 6.49 | | |
| Glass Pearls | 14.00 | | | | 14.0 | | | | — | | |
| Alternative filer | 5.00 | | | | 5.0 | | | | 5.0 | | |
| Limestone | — | | | | — | | | | 36.00 | | |
| Ageing at 80° C. | 0 | 1 m | 2 m | 3 m | 0 | 1 m | 2 m | 3 m | 0 | 1 m | 2 m | 3 m |
| R&B (° C.) | 131 | 119 | 110 | 106 | 133 | 122 | 111 | | 130 | 123 | 117 | 115 |
| Pen 25 (¹/₁₀ mm) | 48 | 30 | 30 | 30 | 44 | 28 | 22 | | 37 | 24 | 23 | 20 |
| Pen 50 (¹/₁₀ mm) | 104 | 73 | 72 | 80 | 100 | 72 | 71 | | 98 | 69 | 64 | 61 |
| EN 13301 | 2 | 15 | 18 | 18 | 3 | 4 | | | 3 | 4 | 7 | 8 |
| Permanent set % | 8 | 22 | 15 | 13 | 8 | 16 | | | 8 | 14 | 12 | 17 |
| Cold Bend. (° C.) | −26 | −22 | −16 | −12 | −22 | −18 | | | −30 | −18 | −18 | −16 |
| Density (g/cm³) | 0.92 | | | | 0.90 | | | | 1.30 | | | |
| cPo @ 180° C. | 7400 | | | | 8200 | | | | 7050 | | | |
| cPo @ 190° C. | 4850 | | | | 5300 | | | | 4900 | | | |
| cPo @ 200° C. | 3400 | | | | 3800 | | | | 3800 | | | |
| cPo @ 210° C. | 2500 | | | | 2850 | | | | 2900 | | | |

REFERENCES

102 Granules/slate/fleece/paint, e.g. acrylic based paint, PVB, and/or PVA
104 Top side blend
106 impregnated reinforcement layer
108 Backside blend
110 Separation layer, e.g. sand, or paint such as e.g. acrylic based paint, PVB, and/or PVA
112 Torching layer
114 Torching foil, e.g. PP film, PE film, PE fleece.

The invention claimed is:

1. A waterproofing membrane comprising a reinforcing material that includes a blend formulation, wherein the reinforcing material forms a reinforcement layer positioned between two layers comprising the blend formulation, and a torching foil as the bottom most layer in the waterproofing membrane, wherein the blend formulation is solid at room temperature and comprising:
   50-90% w/w bitumen or 50-90% w/w mix of bitumen and plasticizer;
   2-25% w/w elastomeric block co-polymer; and
   5-45% w/w glass spheres having a particle size between 0.25-0.50 mm and a particle density between 0.5-0.8 g/cm³, wherein interior of each glass sphere is filled with air pockets making it neither hollow nor solid but porous.

2. The waterproofing membrane according to claim 1, wherein the blend formulation further comprises up to 15% w/w limestone.

3. The waterproofing membrane according to claim 1, wherein the blend formulation further comprises up to 15% w/w an alternative filler selected from a group consisting of poly(methyl methacrylate), petcoke, bedcoke, or perlite.

4. The waterproofing membrane according to claim 1, wherein the blend formulation comprises 50-90% w/w bitumen and 0% w/w mix of bitumen and plasticizer.

5. The waterproofing membrane according to claim 1, wherein the blend formulation comprises 50-90% mix of bitumen and plasticizer.

6. The waterproofing membrane according to claim 1, wherein the blend formulation comprises 60-80% w/w bitumen or 60-80% w/w mix of bitumen and plasticizer.

7. The waterproofing membrane according to claim 6, wherein the blend formulation comprises 60-80% w/w bitumen and 0% w/w mix of bitumen and plasticizer.

8. The waterproofing membrane according to claim 6, wherein the blend formulation comprises 60-80% w/w mix of bitumen and plasticizer.

9. The waterproofing membrane according to claim 1, wherein the blend formulation comprises 65-75% w/w bitumen or 65-75% w/w mix of bitumen and plasticizer.

10. The waterproofing membrane according to claim 9, wherein the blend formulation comprises 65-75% w/w bitumen and 0% w/w mix of bitumen and plasticizer.

11. The waterproofing membrane according to claim 9, wherein the blend formulation comprises 65-75% w/w mix of bitumen and plasticizer.

12. The waterproofing membrane according to claim 1, wherein the blend formulation comprises 70-75% w/w bitumen or 70-75% w/w mix of bitumen and plasticizer.

13. The waterproofing membrane according to claim 12, wherein the blend formulation comprises 70-75% w/w bitumen and 0% w/w mix of bitumen and plasticizer.

14. The waterproofing membrane according to claim 12, wherein the blend formulation comprises 70-75% w/w mix of bitumen and plasticizer.

15. The waterproofing membrane according to claim 1, wherein the bitumen is distilled grades or air blown bitumen.

16. The waterproofing membrane according to claim 1, wherein the elastomeric block co-polymer and/or ter-polymer is selected from the group consisting of Styrene-Butadiene-Styrene (SBS), Styrene-Isoprene-Styrene (SIS), Styrene-Ethylene-Butadiene-Styrene (SEBS), Styrene-Butadiene (SB) and mixtures thereof.

17. The waterproofing membrane according to claim 1, wherein the blend formulation comprises 5-20% w/w elastomeric block co-polymer and/or ter-polymer.

18. The waterproofing membrane according to claim 17, wherein the blend formulation comprises 8-12% w/w elastomeric block co-polymer and/or ter-polymer.

19. The waterproofing membrane according to claim 1, wherein the blend formulation comprises 10-40% w/w glass spheres.

20. The waterproofing membrane according to claim 1, wherein the blend formulation comprises 10-35% w/w glass spheres.

21. The waterproofing membrane according to claim 1, wherein the blend formulation comprises 10-30% w/w glass spheres.

22. The waterproofing membrane according to claim 1, wherein the blend formulation comprises 10-25% w/w glass spheres.

23. The waterproofing membrane according to claim 1, wherein the blend formulation comprises 12-20% w/w glass spheres.

24. The waterproofing membrane according to claim 1, wherein the blend formulation comprises 15-17% w/w glass spheres.

25. The waterproofing membrane according to claim 1, wherein the elastomeric block co-polymer and/or ter-polymer is Styrene-Butadiene-Styrene.

26. The waterproofing membrane according to claim 1, wherein the blend formulation has a softening point of at least 70° C. as an intrinsic property.

27. The waterproofing membrane according to claim 1, wherein the blend formulation has a softening point of at least 80° C. as an intrinsic property.

28. The waterproofing membrane according to claim 1, wherein the blend formulation has a softening point of at least 90° C. as an intrinsic property.

29. The waterproofing membrane according to claim 1, wherein the blend formulation has a softening point of at least 100° C. as an intrinsic property.

30. The waterproofing membrane according to claim 1, wherein the blend formulation has a softening point between 70 and 175° C. as an intrinsic property.

31. The waterproofing membrane according to claim 1, wherein the blend formulation has a cold bending property of −20° C. or lower as an intrinsic property.

32. The waterproofing membrane according to claim 1, wherein the blend formulation has a cold bending property between −20° C. and −40° C. as an intrinsic property.

33. The waterproofing membrane according to claim 1, wherein the blend formulation has a density of 0.8-1.2 g/cm$^3$, and wherein the blend formulation comprises 2-25% w/w elastomeric block co-polymer and/or ter-polymer.

34. The waterproofing membrane according to claim 1, wherein the waterproofing membrane has a density of 800-1200 g/m$^2$ per mm of waterproofing membrane thickness, and wherein the blend formulation comprises 2-25% w/w elastomeric block co-polymer and/or ter-polymer.

35. The waterproofing membrane according to claim 1, wherein the blend formulation is coated onto the top side of the reinforcement material and on the bottom side of the reinforcement material.

36. The waterproofing membrane according to claim 1, further comprising a torching layer positioned between the torching foil and the blend formulation layer coated onto the bottom side of the reinforcement layer.

37. The waterproofing membrane according to claim 36, further comprising a separation layer positioned between the torching layer and the blend formulation layer coated onto the bottom side of the reinforcement layer.

38. The waterproofing membrane according to claim 37, wherein the separation layer is a sand layer.

39. The waterproofing membrane according to claim 1, further comprising a layer of granules or slate positioned as the top most layer in the waterproofing membrane.

40. The waterproofing membrane according claim 1, wherein the reinforcing material is coated on a top side thereof, or a bottom side thereof, or the top side and the bottom side thereof with the blend formulation.

* * * * *